US012030162B2

(12) United States Patent
Moulton et al.

(10) Patent No.: US 12,030,162 B2
(45) Date of Patent: Jul. 9, 2024

(54) HANDLING TOOL

(71) Applicant: DELPHI TECHNOLOGIES IP LIMITED, St. Michael (BB)

(72) Inventors: Jonathan Moulton, Milton Malsor (GB); Lee R. Jacobs, Cubbington (GB)

(73) Assignee: PHINIA JERSEY HOLDINGS LLC, Wilmington, DE (US)

( * ) Notice: Subject to any disclaimer, the term of this patent is extended or adjusted under 35 U.S.C. 154(b) by 811 days.

(21) Appl. No.: 16/981,390

(22) PCT Filed: Feb. 27, 2019

(86) PCT No.: PCT/EP2019/054908
§ 371 (c)(1),
(2) Date: Sep. 16, 2020

(87) PCT Pub. No.: WO2019/174919
PCT Pub. Date: Sep. 19, 2019

(65) Prior Publication Data

US 2021/0008699 A1 Jan. 14, 2021

(30) Foreign Application Priority Data

Mar. 16, 2018 (GB) .................................... 1804279

(51) Int. Cl.
*B25B 27/00* (2006.01)
*B25B 9/02* (2006.01)
*F02M 61/14* (2006.01)

(52) U.S. Cl.
CPC ............ *B25B 27/0035* (2013.01); *B25B 9/02* (2013.01); *F02M 61/14* (2013.01)

(58) Field of Classification Search
CPC ...... B25B 27/0035; B25B 9/02; F02M 61/14; F02M 65/00
See application file for complete search history.

(56) References Cited

U.S. PATENT DOCUMENTS

| | | | | |
|---|---|---|---|---|
| 3,739,452 | A | 6/1973 | Gadberry | |
| 5,191,690 | A | 3/1993 | Koehn | |
| 5,253,408 | A | 10/1993 | Wright | |
| 5,515,250 | A * | 5/1996 | Ortega | B25B 27/24 81/488 |
| 6,363,596 | B1 | 4/2002 | Reiter et al. | |
| 8,176,609 | B2 * | 5/2012 | Branon | B25B 11/002 81/488 |

(Continued)

FOREIGN PATENT DOCUMENTS

| | | | |
|---|---|---|---|
| CN | 101146993 | A | 3/2008 |
| CN | 205117579 | U | 3/2016 |

(Continued)

*Primary Examiner* — Ryan J. Walters
(74) *Attorney, Agent, or Firm* — Warner Norcross + Judd LLP

(57) ABSTRACT

A handling tool is provided for handling an adaptor for a fuel injector testing machine, the adaptor being arranged to configure a testing assembly of the testing machine for use with a respective fuel injector. The handling tool includes a tool body configured to be gripped by a user and a capture device that can be inserted into the testing assembly to capture the adaptor and retain the adaptor as the handling tool is withdrawn from the testing assembly.

10 Claims, 3 Drawing Sheets

(56) References Cited

U.S. PATENT DOCUMENTS

| | | | | |
|---|---|---|---|---|
| 9,027,394 | B2 | 5/2015 | Kordass et al. | |
| 9,771,907 | B2 | 9/2017 | Meek et al. | |
| 11,339,757 | B2 * | 5/2022 | Jacobs | F02M 65/00 |
| 2011/0173814 | A1 * | 7/2011 | Patel | F04B 53/1087 29/890.121 |
| 2014/0359986 | A1 | 12/2014 | Perez, Jr. | |
| 2014/0366351 | A1 | 12/2014 | Whitaker | |
| 2017/0217002 | A1 | 8/2017 | Palma et al. | |

FOREIGN PATENT DOCUMENTS

| | | | |
|---|---|---|---|
| CN | 205928485 | U | 2/2017 |
| DE | 202012100954 | U1 | 6/2012 |
| KR | 20120002457 | U | 4/2012 |
| WO | 9221874 | A1 | 12/1992 |
| WO | 2004042221 | A2 | 5/2004 |

* cited by examiner

HANDLING TOOL

CROSS REFERENCE TO RELATED APPLICATIONS

This application is a national stage application under 35 USC 371 of PCT Application No. PCT/EP2019/054908 having an international filing date of Feb. 27, 2019, which is designated in the United States and which claimed the benefit of GB Patent Application No. 1804279.6 filed on Mar. 16, 2018, the entire disclosures of each are hereby incorporated by reference in their entirety.

FIELD OF THE INVENTION

This invention relates to a handling tool for an adaptor of a fuel injector testing machine. In particular, the invention relates to a handling tool configured to facilitate insertion and retrieval of a nozzle sealing tip into and from a manifold assembly of a testing machine.

BACKGROUND TO THE INVENTION

Fuel injectors often require testing, for example to confirm that a nozzle performs as expected and to identify leaks or other faults. Such testing may be undertaken as part of a commissioning phase during manufacture, or subsequently at garages and service centres to diagnose problems in use.

Dedicated testing machines are known for performing such test operations. Testing machines may include one or more testing assemblies in the form of manifold assemblies, which typically comprise a cavity into which a fuel injector can be inserted to connect with a fluid circuit of the testing machine. The testing machine also includes facilities configured to operate the injector to perform its normal functions at or near its specified limits, to highlight any problems. For example, the testing machine can deliver a supply of fuel to the injector and activate electronic components of the injector, such as pumps and solenoid actuators, to emulate normal or high load operation of the injector when in use in an engine.

Typically, each manifold assembly of a testing machine is configured for use with a particular category of fuel injector, but can accommodate several different models within that category. For example, a testing machine designed for use with hydraulically actuated electronic unit injectors (HEUI) may handle ten or more different HEUI models.

The dimensions of different injector models vary from one model to the next within each category. Accordingly, a testing machine is typically provided with tooling that acts to adapt a manifold assembly to the characteristics of each model of injector that is to be tested. As such tooling must be placed within the cavity of the manifold assembly, inserting and retrieving the tooling can be challenging, especially as the equipment is typically oily in use.

It is against this background that the invention has been devised.

SUMMARY OF THE INVENTION

According to an aspect of the invention, there is provided a handling tool for handling an adaptor for a fuel injector testing machine. The adaptor is arranged to configure a testing assembly of the testing machine for use with a respective fuel injector. The handling tool comprises a tool body configured to be gripped by a user, and a capture device that can be inserted into the testing assembly to capture the adaptor and retain the adaptor as the handling tool is withdrawn from the testing assembly.

The capture device optionally comprises: a capture cavity formed in the tool body, the capture cavity being arranged to receive a grip formation of the adaptor; and at least one retention formation configured to retain the grip formation of the adaptor within the capture cavity, in use. In such embodiments, the or each retention formation may partially define a shape of an opening to the capture cavity, so that the grip formation of the adaptor can enter the capture cavity when aligned with the opening and can be retained in the capture cavity when not aligned with the opening. The opening to the capture cavity is optionally non-circular. The capture cavity may be generally cylindrical, in which case the opening to the capture cavity may be located at an axial end of the capture cavity. Optionally, a maximum width of the opening does not exceed a minimum width of the capture cavity. For example, the or each retention formation may comprise a lug that extends laterally across the opening to the capture cavity.

The handling tool may comprise a gripping device that is configured to hold the adaptor while inserting the adaptor into the testing assembly, and to release the adaptor when the handling tool is withdrawn from the testing assembly. The gripping device may comprise a magnet assembly, in which case the tool body may be counter-bored to define an inner recess formed within an outer recess, the magnet assembly being held in the inner recess. In such embodiments, a grip formation of the adaptor can be at least partially received in the outer recess. The magnet assembly optionally comprises a magnet within a magnet housing configured to attenuate a magnetic field generated by the magnet, so that the magnetic field is asymmetrical around the magnet assembly. The magnet assembly may be arranged in the handling tool with a strong side of the magnetic field directed into the inner recess so that the magnet assembly is self-retaining in the inner recess under the magnetic field.

In some embodiments, the tool body comprises the capture device. The tool body may also comprise the gripping device, in which case the capture device and the gripping device may be disposed at opposed ends of the tool body.

Another aspect of the invention provides an adaptor for a fuel injector testing machine, the adaptor being arranged to configure a testing assembly of the testing machine for use with a respective fuel injector. The adaptor comprises an adaptor body having a central bore and a grip formation. The adaptor body is configured for insertion into the testing assembly. The central bore is configured to receive a nozzle tip of the fuel injector, and the grip formation is configured to be gripped by a handling tool to enable handling of the adaptor during insertion into and retrieval from the testing assembly.

The grip formation may be configured to be handled by a handling tool according to the above aspect.

The invention also extends to an adaptor system for a fuel injector testing machine. The system comprises an adaptor of the above aspect and a handling tool of the above aspect for inserting and retrieving the adaptor from a testing assembly of the testing machine.

A further aspect of the invention provides a method of handling an adaptor for a fuel injector testing machine, the adaptor being arranged to configure a testing assembly of the testing machine for use with a respective fuel injector. The method comprises manipulating a body of a handling tool to insert a capture device of the handling tool into the testing assembly to capture the adaptor. The method further comprises operating the capture device to capture the adaptor, and withdrawing the handling tool from the testing assembly whilst retaining the adaptor with the capture device. The handling tool may be one according to the above aspect, for example. Similarly, the adaptor may be as defined by the above aspect.

It will be appreciated that preferred and/or optional features of the first aspect of the invention may be incorporated alone or in appropriate combination in the second aspect of the invention also.

BRIEF DESCRIPTION OF THE DRAWINGS

In order that the invention may be more readily understood, preferred non-limiting embodiments thereof will now be described, by way of example only, with reference to the accompanying drawings, in which like features are assigned like reference numbers, and in which.

DETAILED DESCRIPTION OF EMBODIMENTS OF THE INVENTION

Figure 1:
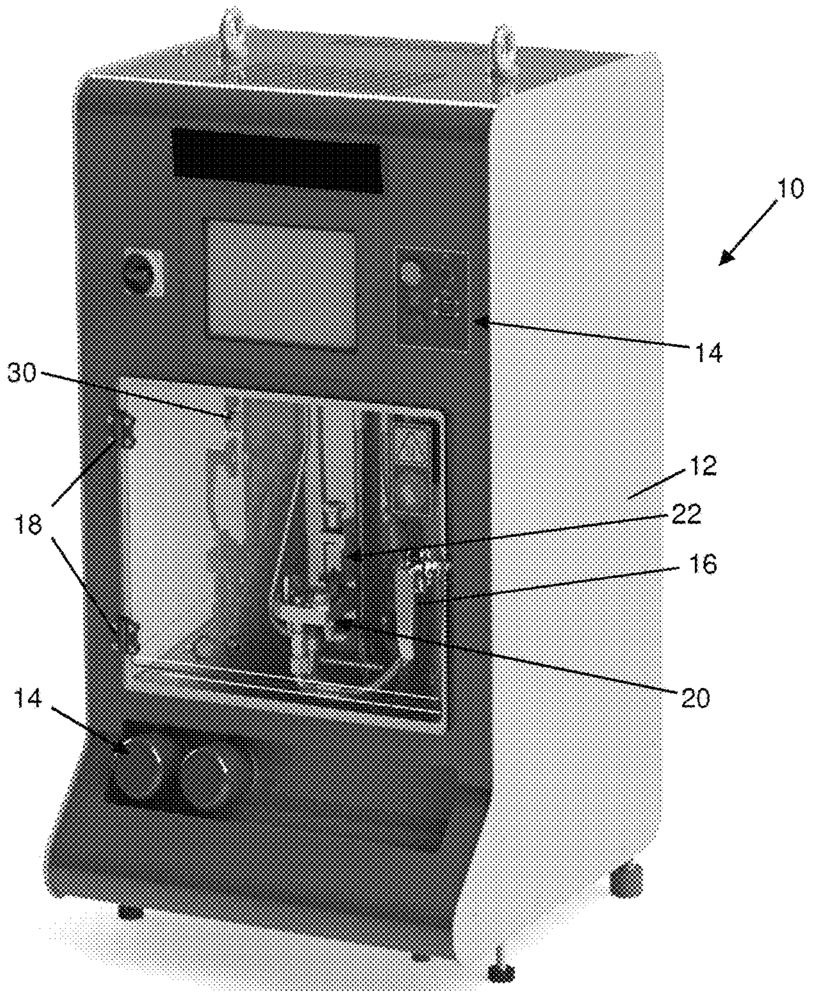
FIG. 1 is a perspective view of a testing machine with which embodiments of the invention may be used.

To set the invention in context, FIG. 1 shows a testing machine 10 for testing the performance of fuel injectors. The example shown in FIG. 1 is the Applicant's 'Toledo HEUI Master', which is configured to test HEUIs. It is noted that the testing machine 10 shown in FIG. 1 is merely an example, and embodiments of the invention are suitable for use with a range of different testing machines configured for use with various types of fuel injectors.

The testing machine 10 of FIG. 1 comprises a cabinet 12 that houses test equipment. The exterior of the cabinet 12 includes a set of user-operable control devices 14 including knobs, buttons and switches, which enable a user to control the internal testing equipment. A door 16 is attached to the cabinet 12 by hinges 18, so that the door 16 can be opened to provide access to the test equipment, for example to install a fuel injector for testing, and then closed to act as a protective shield during testing.

Figure 2:
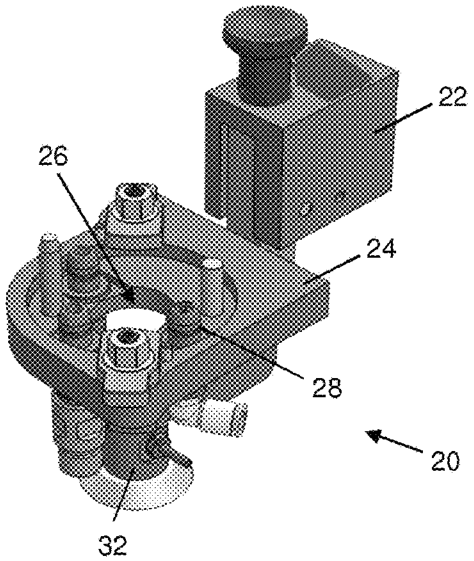
FIG. 2 is a detail view of a manifold assembly of the testing machine of FIG. 1.

As is visible in FIG. 1, the test equipment behind the door 16 of the testing machine 10 includes a testing assembly in the form of a manifold assembly 20, which is supported by a bracket assembly 22. The manifold assembly 20 is shown in more detail in FIG. 2, in which it is clear that the manifold assembly 20 includes an upper platform 24 having a circular aperture 26 into which a fuel injector can be inserted.

The upper platform 24 further includes a series of ports 28 that facilitate connections to a fuel injector under test, to deliver fuel to operate the injector in a manner that emulates its behaviour in use in an engine. An electrical terminal 30 is visible in FIG. 1, through which electrical power is delivered to an injector under test via a cable. The skilled person will be familiar with the ports and terminals included in a testing machine 10, which are therefore not described in detail to avoid obscuring the invention.

Beneath the upper platform 24, the manifold assembly 20 includes a generally cylindrical test pot 32 positioned coaxially with the aperture 26 of the upper platform 24. A planar upper face 34 of the test pot 32 includes a cylindrical recess defining a test pot cavity 36 (visible in FIG. 12), which is configured to receive a nozzle tip of a fuel injector inserted into the aperture 26 of the upper platform 24. Accordingly, a fuel injector under test is supported by the combination of the upper platform 24 and the test pot 32.

During testing, a fuel injector is operated to inject fuel into the test pot cavity 36, so that the test pot cavity 36 performs the role of an injection chamber of an internal combustion engine. Accordingly, the test pot 32 includes a drain for fuel injected during injector tests.

Figure 3:
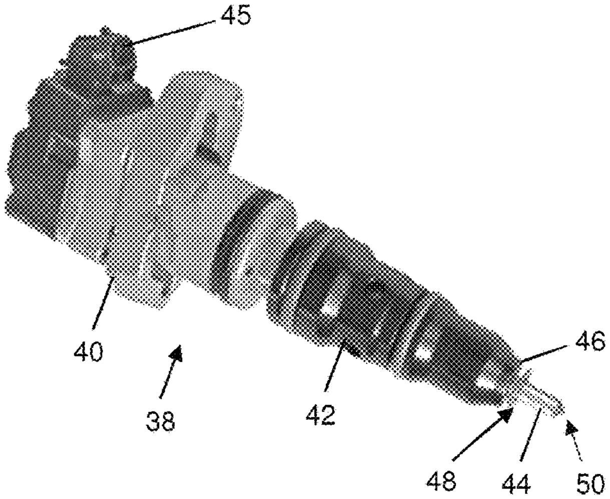
FIG. 3 is a perspective view of a HEUI that may be tested in the testing machine of FIG. 1.

FIG. 3 shows an example of a HEUI 38 that may be tested in the testing machine 10. The HEUI 38 will be familiar to the skilled reader and so is not described in detail, but in overview includes an injector body 40, a nozzle body 42 and a nozzle tip 44 arranged along a common axis, fuel being injected from the nozzle tip 44 in use. The injector body 40 houses fuel flow control components such as valves, pump plungers and solenoid actuators, and includes a connector 45 by which the HEUI 38 may be electrically connected to the terminal 30 of the testing machine 10. The nozzle body 42 typically houses a needle that controls fuel injection, and has a planar, annular end face defining an abutment face 46 that locates the HEUI 38 correctly when installed. The nozzle tip 44 extends axially from the abutment face 46, from a proximal end 48 adjoining the nozzle body 42 to a distal end 50 from which fuel is dispensed.

As alluded to above, the manifold assembly 20 is configured for use with a range of HEUIs, including the example shown in FIG. 3. As the length and diameter of the nozzle tip 44 differ for each HEUI 38, it is not possible for the test pot cavity 36 to be sized for a proper fit with each HEUI 38. In this respect, it will be appreciated that a fluid seal must be present between the test pot cavity 36 and a nozzle tip 44 received in the test pot cavity 36 to prevent leakage of fuel during testing.

Accordingly, tooling in the form of a set of nozzle sealing tips is provided, each nozzle sealing tip of the set being configured to act as an adaptor that creates a sealed interface between the test pot cavity 36 and a nozzle tip 44 of particular dimensions. It follows that each nozzle sealing tip of the set is sized for use with a respective HEUI model, or in some cases multiple HEUI models having nozzle tips 44 of similar dimensions.

Figure 4:
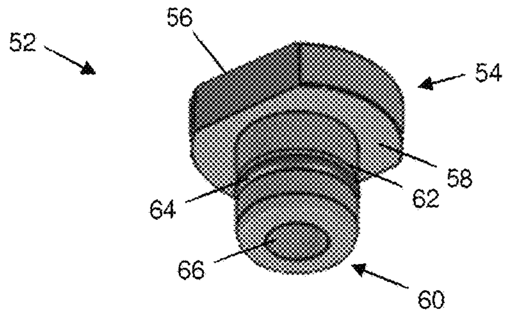
FIG. 4 is a perspective view of a nozzle sealing tip according to an embodiment of the invention for use in the manifold assembly of FIG. 2.

FIG. 4 shows an example of a nozzle sealing tip 52, which comprises a head 54 in the form of a transversely truncated disc having diametrically-opposed, parallel, equally-sized flats 56 defined in an otherwise cylindrical surface that joins parallel planar upper and lower faces 58 (only the lower face is visible in the figures) of the disc. As shall become clear, the head 54 serves as a grip formation that aids handling of the nozzle sealing tip 52 during insertion to and retrieval from the testing machine 10.

A tubular neck 60 extends axially from the lower face 58 of the head 54 so that the nozzle sealing tip 52 is T-shaped in cross-section. The neck 60 is configured for insertion into the test pot cavity 36 of the testing machine 10, and so has a diameter corresponding to that of the test pot cavity 36 to provide a close fit between the neck 60 and the cavity, in use. A cylindrical outer surface of the neck 60 comprises an annular groove 62 that is configured to receive an o-ring 64, which is used to create a fluid seal between the neck 60 and the test pot cavity 36.

The length of the neck 60 is determined such that when the neck 60 is fully inserted to engage an end face of the test pot cavity 36, the planar lower face 58 of the head 54 of the nozzle sealing tip 52 is spaced from the upper face 34 of the test pot 32 by a small gap. The reason for this gap shall become clear in the description that follows.

A central bore 66 extends through the head 54 and the neck 60 of the nozzle sealing tip 52, into which a nozzle tip 44 is inserted in use so that the abutment face 46 of the HEUI 38 engages the upper face of the head 54. Accordingly, the diameter of the central bore 66 generally corresponds to that of the nozzle tip 44 of the, or each, HEUI 38 with which the nozzle sealing tip 52 is arranged to be used. Although not visible in the figures, the surface of the central bore 66 includes a groove that holds an internal o-ring to form a seal between the nozzle sealing tip 52 and the nozzle tip 44.

The separation between the upper and lower faces of the head 54 of the nozzle sealing tip 52 defines the head depth, which is determined to compensate for differences in length between the nozzle tips 44 of different HEUIs, noting that the head depth dictates the position of the abutment face 46 of the HEUI 38 when fitted in the manifold assembly 20. Thus, adjusting the head depth allows control of the final position of the distal end 50 of the nozzle tip 44 when inserted into the nozzle sealing tip 52.

The nozzle sealing tip 52 may be manufactured from steel bar in a series of simple operations, typically in a computer numerical control (CNC) process. For example, the central bore 66 can be drilled, a lathe operation can reduce the diameter of the bar along a portion of its length to define the neck 60 and annular groove 62, and planar faces can be formed in diametrically opposed sides of the head 54 by milling to define the flats 56. The skilled person will appreciate that the nozzle sealing tip 52 may be fabricated in various other ways, although typically from steel or other ferromagnetic materials, for reasons that shall become clear below.

As noted above, insertion and retrieval of the nozzle sealing tip 52 from the manifold assembly 20 is challenging due to the restricted access to the test pot cavity 36. Although it may be possible to position the nozzle sealing tip 52 on the nozzle tip 44 of an HEUI 38 and insert the two in combination, this is undesirable as proper insertion of the sealing tip cannot be confirmed.

Retrieval of the nozzle sealing tip 52 is even more difficult due to a retention force created by the external o-ring 64, which acts to hold the nozzle sealing tip 52 in the test pot cavity 36 when the HEUI 38 is withdrawn. Moreover, following a test the nozzle sealing tip 52 is likely to be covered in oil and so cannot readily be gripped for removal.

The retention force results from friction arising from compression of the o-ring 64 between the surface of the test pot cavity 36 and the exterior of the neck 60. In this respect, the dimensions of the o-ring 64 and the annular groove 62 are determined to create a compression ratio of 15-20% when the nozzle sealing tip 52 is fitted into the test pot cavity 36.

Figure 5:
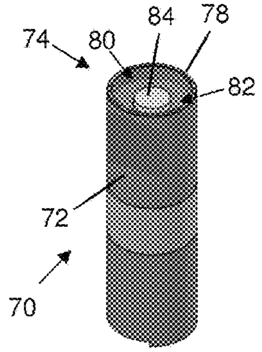
FIG. 5 is a perspective view from above of a nozzle sealing tip handling tool according to an embodiment of the invention.
Figure 6:
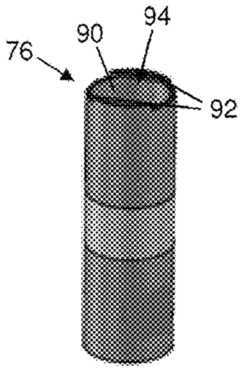
FIG. 6 shows the nozzle sealing tip handling tool of FIG. 5 in perspective view from below.

In view of this, a nozzle sealing tip handling tool 70 is used to install and remove the nozzle sealing tip 52 from the manifold assembly 20. FIGS. 5 and 6 show the nozzle sealing tip handling tool 70 from above and below respectively, from which it is evident that the tool 70 comprises a generally cylindrical main body 72 of steel, having an outer diameter that is no greater than the diameter of the aperture 26 of the upper platform 24 of the manifold assembly 20.

The cylindrical outer surface of the main body 72 is partially or entirely knurled to aid handling, and so the knurled areas of the main body 72 can be considered to represent a handle that lies between opposed ends of the tool 70. In use, the handle can be gripped by a user to manipulate the tool 70.

The opposed ends of the main body 72 of the tool 70 are configured to perform complementary operations: a first end 74 of the body 72, which is shown uppermost in FIG. 5, is configured to hold the nozzle sealing tip 52 during insertion; whereas a second end 76 of the body 72, shown uppermost in FIG. 6, is configured to facilitate retrieval of the nozzle sealing tip 52 from the manifold assembly 20.

Figure 7:
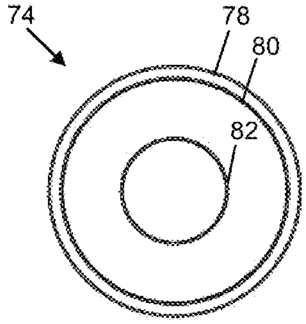
FIG. 7 is an end view of the nozzle sealing tip handling tool of FIG. 5.

As best seen in FIG. 5, an end face of the first end 74 of the main body 72 is counter-bored to define a tubular outer rim 78 enclosing an outer recess 80, within which a central inner recess 82 that contains a magnet assembly 84 is disposed. FIG. 7 is an end view of the first end 74 of the main body 72 of the tool 70, and shows that the outer rim 78, outer recess 80 and inner recess 82 are coaxial.

Figure 8:
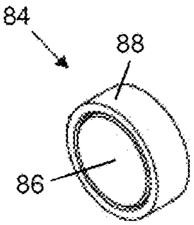
FIG. 8 is a perspective view of a magnet of the nozzle sealing tip handling tool of FIG. 5.

FIG. 8 shows the magnet assembly 84 in isolation, which illustrates that the magnet assembly 84 is composed of a disc magnet 86 contained in a cylindrical magnet housing 88, the magnet 86 being held in place within the housing 88 by an adhesive. The housing 88 is open at one end and closed at the other end, so that one planar surface of the magnet 86 is exposed whereas the opposite planar surface is shielded behind the closed end of the housing 88.

The housing material attenuates a magnetic field generated by the magnet 86, and so the magnetic field emanating from the shielded side of the magnet 86 is suppressed relative to the field around the exposed side of the magnet 86. In this way, the housing 88 modifies the magnetic field of the magnet assembly 84 so that it is asymmetrical, having a strong side around the exposed face of the magnet 86 and a weak side around the covered face of the magnet 86.

In this embodiment, the magnet 86 used is a standard component that produces an attraction force of approximately 6 kg when in contact with a ferromagnetic object. It follows that the attenuated field on the weak side of the magnet assembly 84 where the magnet 86 is covered by the magnet housing 88 produces an attraction force with ferromagnetic objects that is somewhat lower.

Returning to FIG. 5, the magnet assembly 84 is fitted into the inner recess 82 of the first end 74 of the main body 72 of the nozzle sealing tip handling tool 70 so that the exposed face of the magnet 86 engages an end face of the inner recess 82. It follows that the magnet 86 is hidden from view once installed, and so only the housing 88 is visible in FIG. 5.

By arranging the magnet assembly 84 in this way, the strong side of the magnetic field is directed towards the main body 72 so that the magnet assembly 84 is self-retaining in the inner recess 82, noting that the main body 72 is of ferromagnetic material and so is attracted to the magnet 86.

As the weak side of the magnetic field faces outward from the inner recess 82, it follows that the magnet assembly 84 cannot be removed by attaching another ferromagnetic object to the accessible face of the magnet assembly 84, since an attraction force between the magnet assembly 84 and that object will necessarily be lower than the attraction force between the opposed side of the magnet assembly 84 and the main body 72 of the nozzle sealing tip handling tool 70.

Figure 9:
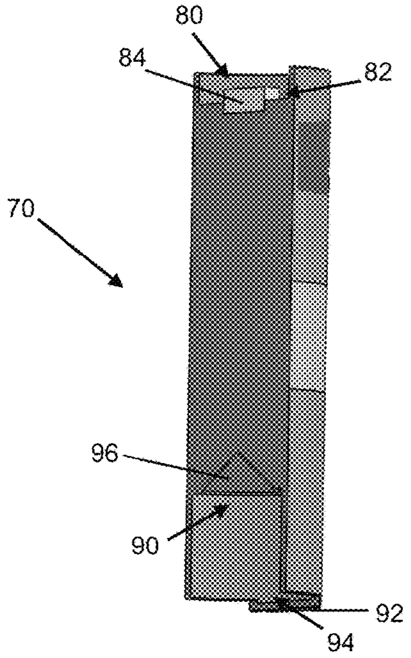
FIG. 9 is a perspective view of the nozzle sealing tip handling tool of FIG. 5 in longitudinal cross-section.
Figure 10:
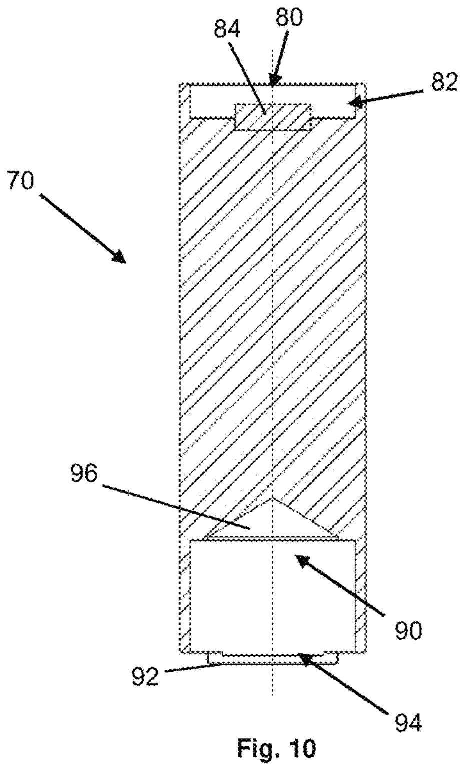
FIG. 10 is a side view of the nozzle sealing tip handling tool of FIG. 5 in longitudinal cross-section.

FIGS. 9 and 10 show the nozzle sealing tip handling tool 70 in longitudinal cross-section, and reveal that the depth of the inner recess 82 of the first end 74 of the main body 72 is approximately half that of the magnet assembly 84. Thus, the upper face of the magnet assembly 84, as viewed in FIGS. 9 and 10, sits slightly proud of a planar bottom face of the outer recess 80. This provides an accessible region of the magnet assembly 84 that can be gripped to remove the magnet assembly 84 if necessary.

In use, the magnet assembly 84 is used to hold the head 54 of the nozzle sealing tip 52, which it is reiterated is of ferromagnetic material in this embodiment. Accordingly, the diameter of the outer recess 80 corresponds to the maximum diameter of the nozzle sealing tip head 54.

The depth of the outer recess 80 is greater than the extent to which the magnet assembly 84 protrudes into the outer recess 80, and so an upper edge of the outer rim 78 is above the upper face of the magnet assembly 84. Accordingly, there is space in the outer recess 80 to accommodate a portion of the depth of the head 54 of the nozzle sealing tip 52 within the boundary of the outer rim 78. Thus, together the magnet assembly 84 and the outer rim 78 form a gripping device that grips the nozzle sealing tip 52 as it is inserted into the manifold assembly 20.

Noting that the nozzle sealing tip handling tool 70 is arranged for use with nozzle sealing tips 52 having heads of varying depth, the dimensions of the first end 74 of the nozzle sealing tip handling tool 70 are configured to ensure that any nozzle sealing tip head 54 held in the outer recess 80 protrudes beyond the outer rim 78 to some extent. This ensures that each nozzle sealing tip 52 can be fully inserted into the test pot cavity 36 by the nozzle sealing tip handling tool 70.

Once received in the outer recess 80, the head 54 is retained by the weak side of the magnetic field of the magnet assembly 84. As this side of the magnetic field is attenuated by the magnet housing 88, the attraction force that holds the head 54 in the outer recess 80 is relatively low. So, while this attraction force is sufficient to retain the nozzle sealing tip 52 against gravity, only a small additional force is required to release the head 54 from the first end 74 of the nozzle sealing tip handling tool 70.

In this respect, it is noted that the retention force created by the external o-ring 64 is greater than the attraction force between the magnet assembly 84 and the head 54 of the nozzle sealing tip 52. Accordingly, once the nozzle sealing tip 52 is pressed into the test pot cavity 36 it will be held in place when the nozzle sealing tip handling tool 70 is withdrawn, and thus released from the tool 70. Meanwhile, the attraction force between the magnet assembly 84 and the main body 72 of the nozzle sealing tip handling tool 70 is sufficient to hold the magnet assembly 84 in the inner recess 82 of the first end 74 of the tool 70 while the magnet assembly 84 is pulled away from the head 54 of the nozzle sealing tip 52.

Figure 11:
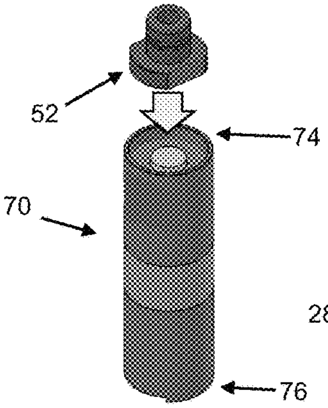
FIGS. 11-13 illustrate a process for fitting the nozzle sealing tip of FIG. 4 into the manifold assembly of FIG. 2 using the nozzle sealing tip handling tool of FIG. 5.
Figure 12:
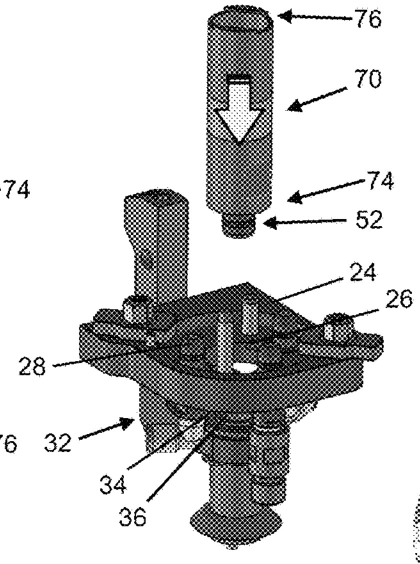
Figure 13:
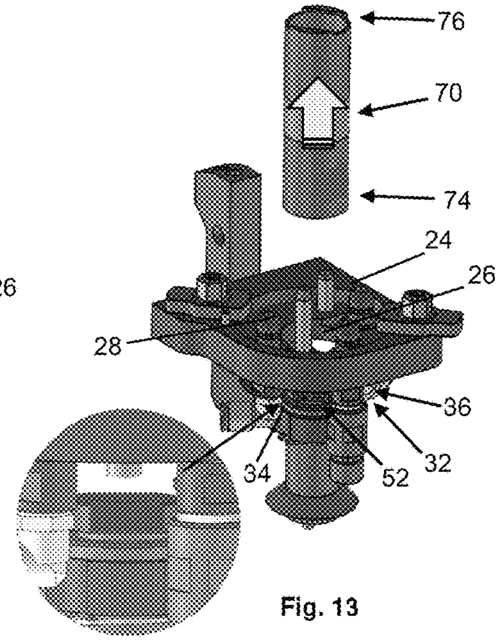

The above described process for inserting the nozzle sealing tip 52 using the first end 74 of the nozzle sealing tip handling tool 70 is illustrated in FIGS. 11-13. FIG. 11 shows the head 54 of the nozzle sealing tip 52 being aligned with the outer rim 78 of the first end 74 of the tool 70, to be received in the outer recess 80 to engage the magnet assembly 84. FIG. 12 shows the nozzle sealing tip 52 held in the outer recess 80 of the first end 74 of the nozzle sealing tip handling tool 70 as it is lowered towards the test pot 32 of the manifold assembly 20 through the aperture 26 of the upper platform 24. Finally, FIG. 13 shows the nozzle sealing tip handling tool 70 being withdrawn from the manifold assembly 20 while the nozzle sealing tip 52 is retained in the test pot cavity 36, which is shown in the auxiliary view included in FIG. 13. At this stage, the nozzle sealing tip 52 is ready to receive the nozzle tip 44 of an HEUI 38 for testing.

Returning to FIG. 6, the second end 76 of the main body 72 of the nozzle sealing tip handling tool 70 shall now be considered, which as already noted is configured to facilitate retrieval of the nozzle sealing tip 52 from the manifold assembly 20.

As FIG. 6 shows, the second end 76 of the main body 72 includes a capture cavity 90, which is configured to receive and retain the head 54 of the nozzle sealing tip 52. FIGS. 9 and 10 reveal that the capture cavity 90 is substantially deeper than the outer recess 80, so that the head 54 of any nozzle sealing tip 52 to be used with the testing machine 10 can be entirely received within the capture cavity 90.

Opposed identical lugs 92 extend laterally towards one another across the top of the capture cavity 90, terminating in planar faces parallel to a central axis of the cavity. The lugs 92 therefore partially define the shape of an opening 94 into the capture cavity 90, that shape being non-circular and corresponding to the shape of the transverse cross-section of the head 54 of the nozzle sealing tip 52. Accordingly, the nozzle sealing tip head 54 must be aligned with the opening 94 before entering the capture cavity 90.

The lugs 92 are undercut, so that the capture cavity 90 is cylindrical beneath the lugs 92. As a result, the lugs 92 take the form of partial discs disposed diametrically opposite each other across the top of the capture cavity 90.

Thus, once inside the capture cavity 90, the head 54 of the nozzle sealing tip 52 can rotate within the capture cavity 90 beneath the lugs 92. It follows that rotating the nozzle sealing tip head 54 out of alignment with the opening 94 to the capture cavity 90 while in the capture cavity 90 will prevent removal of the head 54 from the second end 76 of the nozzle sealing tip handling tool 70. Instead, in this situation the nozzle sealing tip head 54 is retained in the capture cavity 90 by the lugs 92 until the head 54 is rotated to align once more with the opening 94 to the capture cavity 90. In this way, the lugs 92 define retention formations that cooperate with the capture cavity 90 to define a capture device that enables use of the second end 76 of the nozzle sealing tip handling tool 70 to retrieve a nozzle sealing tip 52 from the manifold assembly 20, as shall now be explained with reference to FIGS. 14-16.

It is first noted that the axial depth of the lugs 92 does not exceed the size of the gap by which the planar lower face 58 of the nozzle sealing tip head 54 is spaced from the upper face 34 of the test pot 32 when installed. This ensures that the lugs 92 can slide underneath the head 54 of a nozzle sealing tip head 54 fitted in the test pot 32, enabling the lugs 92 to capture and retrieve the nozzle sealing tip 52.

It is also noted that an end face 96 of the capture cavity 90 is shown as partially conical in form in FIGS. 9 and 10, which indicates that the capture cavity 90 of this embodiment is formed by making an initial drilling. This drilling is then widened along most of its depth, for example on a lathe, leaving an unwidened region at the upper end of the cavity. This unwidened region is then milled across its diameter to create the lugs 92. Hence, the conical region of the end face 96 shown in FIGS. 9 and 10 does not span the full width of the capture cavity 90.

Figure 14:
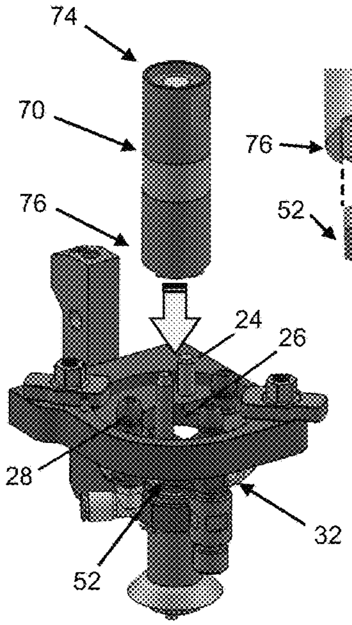
FIGS. 14-16 illustrate a process for retrieving the nozzle sealing tip of FIG. 4 from the manifold assembly of FIG. 2 using the nozzle sealing tip handling tool of FIG. 5.

Turning now to FIG. 14, the nozzle sealing tip handling tool 70 is shown with its second end 76 directed downwardly towards the manifold assembly 20 of the testing machine 10. Although not visible in FIG. 14, a nozzle sealing tip 52 is held in the manifold assembly 20, which is to be removed by the nozzle sealing tip handling tool 70.

The second end 76 of the nozzle sealing tip handling tool 70 is then inserted through the aperture 26 of the upper platform 24 of the manifold assembly 20. At some stage during insertion, the nozzle sealing tip handling tool 70 is rotated as necessary to align the capture cavity opening 94 with the head 54 of the nozzle sealing tip 52, so that the head 54 is admitted into the capture cavity 90 as the nozzle sealing tip handling tool 70 is lowered.

Figure 15:
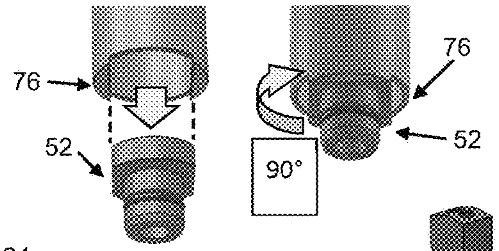

Once the planar external faces of the lugs 92 engage the upper face of the test pot, the nozzle sealing tip handling tool 70 can be lowered no further. At this stage, as FIG. 15 shows, the nozzle sealing tip head 54 is entirely received inside the capture cavity 90, and the nozzle sealing tip handling tool 70 is rotated by 90° so that the lugs 92 slide underneath the widest portions of the head 54 to move the head 54 out of alignment with the capture cavity opening 94. As noted above, this prevents removal of the head 54 from the capture cavity 90 so that head 54 is held captive by the nozzle sealing tip handling tool 70.

Figure 16:
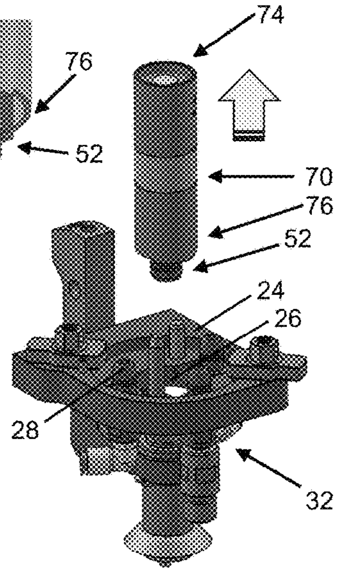

As FIG. 16 shows, the nozzle sealing tip handling tool 70 is then withdrawn from the manifold assembly 20 together with the captured nozzle sealing tip 52. Finally, the nozzle sealing tip 52 can be twisted to realign the head 54 with the capture cavity opening 94, allowing removal of the nozzle sealing tip 52 from the tool 70.

In summary, the nozzle sealing tip handling tool 70 described above has one end configured to hold a nozzle sealing tip 52 during insertion into the manifold assembly 20 and a second end 76 configured to capture the nozzle sealing tip 52 for subsequent removal. Thus, the nozzle sealing tip handling tool 70 provides a simple and reliable means for fitting and retrieving a range of nozzle sealing tips to and from the testing machine 10, which overcomes the difficulties associated with restricted access to the test pot and the equipment being generally oily and therefore difficult to handle.

Like the nozzle sealing tip 52, the handling tool 70 may be manufactured from steel bar, with the various features of the tool 70 being created by a series of CNC operations.

Various alternative embodiments exist that achieve these same objectives. For example, the head of the nozzle sealing tip and the opening to the capture cavity could take various other shapes while preserving the ability to lock the head within the capture cavity by relative rotation of the two. In the simplest variation, the second end of the nozzle sealing tip handling tool may have a single lug instead of a pair of lugs, which would provide similar functionality.

In general terms, for the nozzle sealing tip head to be retainable in the capture cavity, the capture cavity opening must be non-circular and have a minimum width that exceeds a maximum width of the nozzle sealing tip head. Ideally, the opening has a maximum width that does not exceed the minimum width of the cavity, so that any head that can fit through the opening can rotate within the cavity. The shape of the opening will also ideally correspond to the cross-sectional shape of the nozzle sealing tip head. The skilled person will appreciate that there are infinite possibilities within these general principles.

Instead of using retention formations such as lugs, the capture device of the second end of the nozzle sealing tip handling tool could take the form of a magnet assembly similar to that used in the first end of the nozzle sealing tip handling tool. It will be appreciated that to operate as a capture device, such a magnet assembly must be configured to generate an attraction force between the second end of the tool and the nozzle sealing tip that is sufficient to overcome the retention force that holds the neck of the nozzle sealing tip inside the test pot cavity. In other words, the magnetic field around an exposed side of the magnet assembly at the second end must exceed the magnetic field around the exposed side of the magnet assembly at the first end of the tool. This may be achieved by using a stronger magnet at the second end, or by removing some or all of the magnet housing to expose the magnet at the second end, for example.

Conversely, in other embodiments the magnet assembly at the first end of the nozzle sealing tip handling tool could be replaced with retention formations such as lugs that are arranged to hold the nozzle sealing tip during insertion into the manifold assembly, whilst ensuring that the nozzle sealing tip is readily releasable from the nozzle sealing tip handling tool once in position. In such arrangements, the nozzle sealing tip may be biased away from the body of the nozzle sealing tip handling tool, for example using a spring mechanism, to ensure that the nozzle sealing tip is fully inserted into the manifold assembly.

It follows from the above that in some possible variants a combined gripping and capture device could be provided at one end of the body of the nozzle sealing tip handling tool, to facilitate both insertion and retrieval of the nozzle sealing tip. For example, the end of the main body could include a cavity to receive the head of the nozzle sealing tip, retention formations to hold the head captive in the cavity when necessary, and a biasing mechanism to ensure full insertion of the nozzle sealing tip into the manifold assembly. Alternatively, the end of the nozzle sealing tip handling tool may include a magnet that is strong enough to overcome the retention force that holds the nozzle sealing tip in the test pot, and further include a release mechanism that actuates release of the nozzle sealing tip from the magnet once inserted into the manifold assembly.

It will be appreciated by a person skilled in the art that the invention could be modified to take many alternative forms to that described herein, without departing from the scope of the appended claims.

REFERENCES USED

10—testing machine
12—cabinet
14—control devices
16—door
18—hinges
20—manifold assembly
22—bracket assembly
24—upper platform
26—aperture
28—ports
30—terminal
32—test pot
34—upper face
36—test pot cavity
38—HEUI

40—injector body
42—nozzle body
44—nozzle tip
45—connector
46—abutment face
48—proximal end
50—distal end
52—nozzle sealing tip
54—head
56—flats
58—lower face
60—neck
62—annular groove
64—o-ring
66—central bore
70—nozzle sealing tip handling tool
72—main body
74—first end of the body
76—second end of the body
78—outer rim
80—outer recess
82—inner recess
84—magnet assembly
86—magnet
88—magnet housing
90—capture cavity
92—lugs
94—opening
96—end face of capture cavity

The invention claimed is:

1. A handling tool and adaptor assembly for a fuel injector testing machine, the handling tool and adaptor assembly comprising a handling tool and an adaptor which are arranged to configure a testing assembly of the fuel injector testing machine for use with a respective fuel injector, the handling tool being arranged to handle the adaptor and wherein the handling tool comprises:

a tool body configured to be gripped by a user, the tool body comprising:

an insertable capture device at one end of the tool body for insertion into the testing assembly, to capture the adaptor and retain the adaptor as the handling tool is withdrawn from the testing assembly, wherein the capture device comprises a capture cavity formed in the tool body, the capture cavity being arranged to receive a grip formation of the adaptor, and at least one retention formation configured to retain the grip formation of the adaptor within the capture cavity the tool body further comprising an insertable gripping device for insertion into the testing assembly, the insertable gripping device being disposed at an opposite end of the tool body relative to the insertable capture device, to hold the adaptor while inserting the adaptor into the testing assembly and to release the adaptor from the handling tool when the handling tool is withdrawn from the testing assembly.

2. The handling tool of claim 1, wherein the or each said at least one retention formation partially defines a shape of an opening to the capture cavity, so that the grip formation of the adaptor enters the capture cavity when aligned with the opening and is retained in the capture cavity when not aligned with the opening.

3. The handling tool of claim 2, wherein the opening to the capture cavity is non-circular.

4. The handling tool of claim 2, wherein the capture cavity is generally cylindrical and wherein the opening to the capture cavity is located at an axial end of the capture cavity.

5. The handling tool of claim 2, wherein a maximum width of the opening does not exceed a minimum width of the capture cavity.

6. The handling tool of claim 1, wherein the gripping device comprises a magnet assembly.

7. The handling tool of claim 6, wherein the tool body is counter-bored to define an inner recess formed within an outer recess, wherein the magnet assembly is held in the inner recess and a grip formation of the adaptor can be at least partially received in the outer recess.

8. The handling tool of claim 7, wherein:

the magnet assembly comprises a magnet within a magnet housing configured to attenuate a magnetic field generated by the magnet, so that the magnetic field is asymmetrical around the magnet assembly; and the magnet assembly is arranged in the handling tool with a strong side of the magnetic field directed into the inner recess so that the magnet assembly is self-retaining in the inner recess under the magnetic field.

9. The handling tool of claim 1, wherein the adaptor comprises:

an adaptor body having a central bore and a grip formation, wherein:

the adaptor body is configured for insertion into the testing assembly;

the central bore is configured to receive a nozzle tip of the fuel injector; and the grip formation is configured to be gripped by the handling tool to enable handling of the adaptor during insertion into and retrieval from the testing assembly.

10. A method of handling an adaptor for a fuel injector testing machine, the method comprising:

providing the handling tool and adaptor assembly of claim 1;

manipulating the tool body of the handling tool to insert the capture device of the handling tool into the testing assembly to capture the adaptor;

operating the capture device to capture the adaptor; and withdrawing the handling tool from the testing assembly whilst retaining the adaptor with the capture device.

* * * * *